(12) United States Patent
Morito et al.

(10) Patent No.: US 10,044,105 B2
(45) Date of Patent: Aug. 7, 2018

(54) VARIABLE CAPACITANCE DEVICE AND COMMUNICATION APPARATUS

(71) Applicant: TAIYO YUDEN CO., LTD., Taito-ku, Tokyo (JP)

(72) Inventors: Kentaro Morito, Takasaki (JP); Daiki Ishii, Takasaki (JP); Masashi Natsume, Takasaki (JP); Tomokazu Ikenaga, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 126 days.

(21) Appl. No.: 15/027,425

(22) PCT Filed: Oct. 3, 2014

(86) PCT No.: PCT/JP2014/076505
§ 371 (c)(1),
(2) Date: Apr. 5, 2016

(87) PCT Pub. No.: WO2015/053173
PCT Pub. Date: Apr. 16, 2015

(65) Prior Publication Data
US 2016/0254599 A1    Sep. 1, 2016

(30) Foreign Application Priority Data
Oct. 7, 2013   (JP) .................. 2013-210026

(51) Int. Cl.
*H01G 7/00* (2006.01)
*H01Q 7/00* (2006.01)
(Continued)

(52) U.S. Cl.
CPC ............... *H01Q 7/005* (2013.01); *H01G 7/06* (2013.01); *H01G 17/00* (2013.01)

(58) Field of Classification Search
CPC ............. H01G 7/00; H01G 7/06; H01G 17/00
(Continued)

(56) References Cited

U.S. PATENT DOCUMENTS 6,674,321 B1    1/2004 York
7,557,773 B2 *  7/2009 Sekiguchi .............. H01Q 1/244
                                                343/702
(Continued)

FOREIGN PATENT DOCUMENTS

JP    2006196704 A    7/2006
JP    2006196871 A    7/2006
(Continued)

OTHER PUBLICATIONS

International Search Report (ISR) dated Jan. 6, 2015, issued for International application No. PCT/JP2014/076505.

*Primary Examiner* — Lee Nguyen
(74) *Attorney, Agent, or Firm* — Law Office of Katsuhiro Arai (57) ABSTRACT

A variable capacitance device includes: (A) a first signal line that contains multiple first variable capacitance elements connected in series; (B) a second signal line that contains multiple second variable capacitance elements connected in series; (C) a first bias line used for applying a first direct-current voltage to each of the multiple first variable capacitance elements and multiple second variable capacitance elements; and (D) a second bias line used for applying a second direct-current voltage to each of the multiple first variable capacitance elements and multiple second variable capacitance elements. And, a part of at least one of the first bias line and second bias line is arranged so that it passes between two adjacent first variable capacitance elements among the multiple first variable capacitance elements.

10 Claims, 10 Drawing Sheets (51) Int. Cl.
  *H01G 7/06* (2006.01)
  *H01G 17/00* (2006.01)
  *H01G 5/013* (2006.01)
(58) Field of Classification Search
  USPC .................................................. 361/277, 278
  See application file for complete search history.

(56) References Cited

U.S. PATENT DOCUMENTS

| | | | |
|---|---|---|---|
| 2009/0128249 A1* | 5/2009 | Katta | ........................ H03H 7/20 333/17.1 |
| 2009/0310275 A1 | 12/2009 | Katta | |
| 2014/0225793 A1 | 8/2014 | Ikemoto et al. | |

FOREIGN PATENT DOCUMENTS

| | | | |
|---|---|---|---|
| JP | 2008211064 A | 9/2008 | |
| JP | 2011119482 A | 6/2011 | |
| WO | 2008001914 A1 | 1/2008 | |
| WO | 2013061985 A1 | 5/2013 | |

* cited by examiner

VARIABLE CAPACITANCE DEVICE AND COMMUNICATION APPARATUS

This application is the U.S. National Phase under 35 U.S.C. § 371 of International Application PCT/JP2014/076505, filed Oct. 3, 2014, which claims priority to Japanese Patent Application No. 2013-210026, filed Oct. 7, 2013. The International Application was published under PCT Article 21(2) in a language other than English.

TECHNICAL FIELD

The present invention relates to a variable capacitance device and a communication apparatus using such device.

BACKGROUND ART

Thin strontium titanate film which is a paraelectric material, and thin barium strontium titanate film which is a ferroelectric material, have a higher dielectric constant compared to thin $SiO_2$ film and thin SiN film used in semiconductor processes. Accordingly, these materials are considered suitable for designing circuits having smaller areas. These thin films of high dielectric constant are characterized in that their capacitance drops according to the direct-current voltage applied.

Variable capacitance devices are devices that utilize such characteristics of thin films in their elements. Among the known types of such variable capacitance devices is one comprising multiple variable capacitance elements connected in series, where each element is formed by conductor layers sandwiching a thin film like those mentioned above, with one end of each variable capacitance element connected to a terminal used for applying control voltage, and the other end connected to a terminal used for connecting to ground. With this variable capacitance device, raising the control voltage causes the capacitance to drop due to the aforementioned action of the thin film.

Such variable capacitance device comprises at least one variable capacitance element, at least one wiring part having inductor and resistance components, and wiring parts through which to apply direct-current voltage thereto, and accordingly the Q value (quality factor) determined by the capacitance and inductance of the device has frequency characteristics. In addition, generally with a circuit having capacitance and inductance, the resonance frequency of the circuit tends to drop as the capacitance increases.

As described above, the frequency characteristics pertaining to the Q value of a variable capacitance device is not necessarily appropriate for the frequency band of the signals passing through the variable capacitance device. Particularly when a frequency band lower than the frequency band of the signals includes a frequency at which the Q value of the variable capacitance device becomes the maximum, then the efficiency of the circuit that uses the variable capacitance device drops significantly.

BACKGROUND ART LITERATURE

Patent Literature

Patent Literature 1: U.S. Pat. No. 6,674,321
Patent Literature 2: Japanese Patent Laid-open No. 2011-119482
Patent Literature 3: Japanese Patent Laid-open No. 2006-196704

SUMMARY OF THE INVENTION

Problems to be Solved by the Invention

Accordingly, an object of the present invention, according to one aspect thereof, is to raise the Q value of a variable capacitance device in the frequency band in which the device is used.

Means for Solving the Problems

A variable capacitance device pertaining to the present invention comprises: (A) a first signal line that contains multiple first variable capacitance elements connected in series; (B) a second signal line that contains multiple second variable capacitance elements connected in series; (C) a first bias line used for applying a first direct-current voltage to each of the multiple first variable capacitance elements and multiple second variable capacitance elements; and (D) a second bias line used for applying a second direct-current voltage to each of the multiple first variable capacitance elements and multiple second variable capacitance elements. And, a part of at least one of the first bias line and second bias line is arranged so that it passes between two adjacent first variable capacitance elements among the multiple first variable capacitance elements.

The Q value can be raised by introducing multiple signal lines as described above. Although the signal lines as a whole extend horizontally, the variable capacitance elements contained in them are stacked vertically and therefore empty space exists between the variable capacitance elements. In a mode in which the present invention is carried out, this space is used to wire bias lines, and accordingly a small device offering high space utilization efficiency can be produced. Incidentally, the first direct-current voltage is control voltage, for example, and the second direct-current voltage is 0 V (ground), for example.

It is also possible that the part of at least one of the first bias line and second bias line is formed in the same layer as one of the two electrode layers respectively contained in two adjacent first variable capacitance elements among the multiple first variable capacitance elements. This way, cost increase can be suppressed because there is no longer a need to form additional conductor layers for the bias lines.

It may also be that the number of the first variable capacitance elements is 4 or greater; the number of the second variable capacitance elements is 4 or greater; a part of the first bias line is arranged so that it passes between two adjacent first variable capacitance elements among the multiple first variable capacitance elements; a part of the second bias line is arranged so that it passes between two adjacent second variable capacitance elements among the multiple second variable capacitance elements; and the relative positions of the two first variable capacitance elements among the multiple first variable capacitance elements are different from the relative positions of the two second variable capacitance elements among the multiple second variable capacitance elements. This way, the bias lines can be wired with greater space utilization efficiency.

It may further be that a part of the first bias line and part of the second bias line are formed in the same layer as one of the two electrode layers respectively contained in two adjacent first variable capacitance elements among the multiple first variable capacitance elements. This way, increase in manufacturing cost can be suppressed.

It may further be that another part of the first bias line is formed in the same layer as the other of the two electrode layers. The purpose here is to prevent the bias lines from crossing each other.

The aforementioned constitutions are explained in detail in the embodiments below; however, it should be noted that the present invention is not limited in any way to these embodiments.

Effects of the Invention

According to one aspect of the present invention, the Q value of a variable capacitance device can be raised in the frequency band in which the device is used.

MODE FOR CARRYING OUT THE INVENTION

Figure 1:
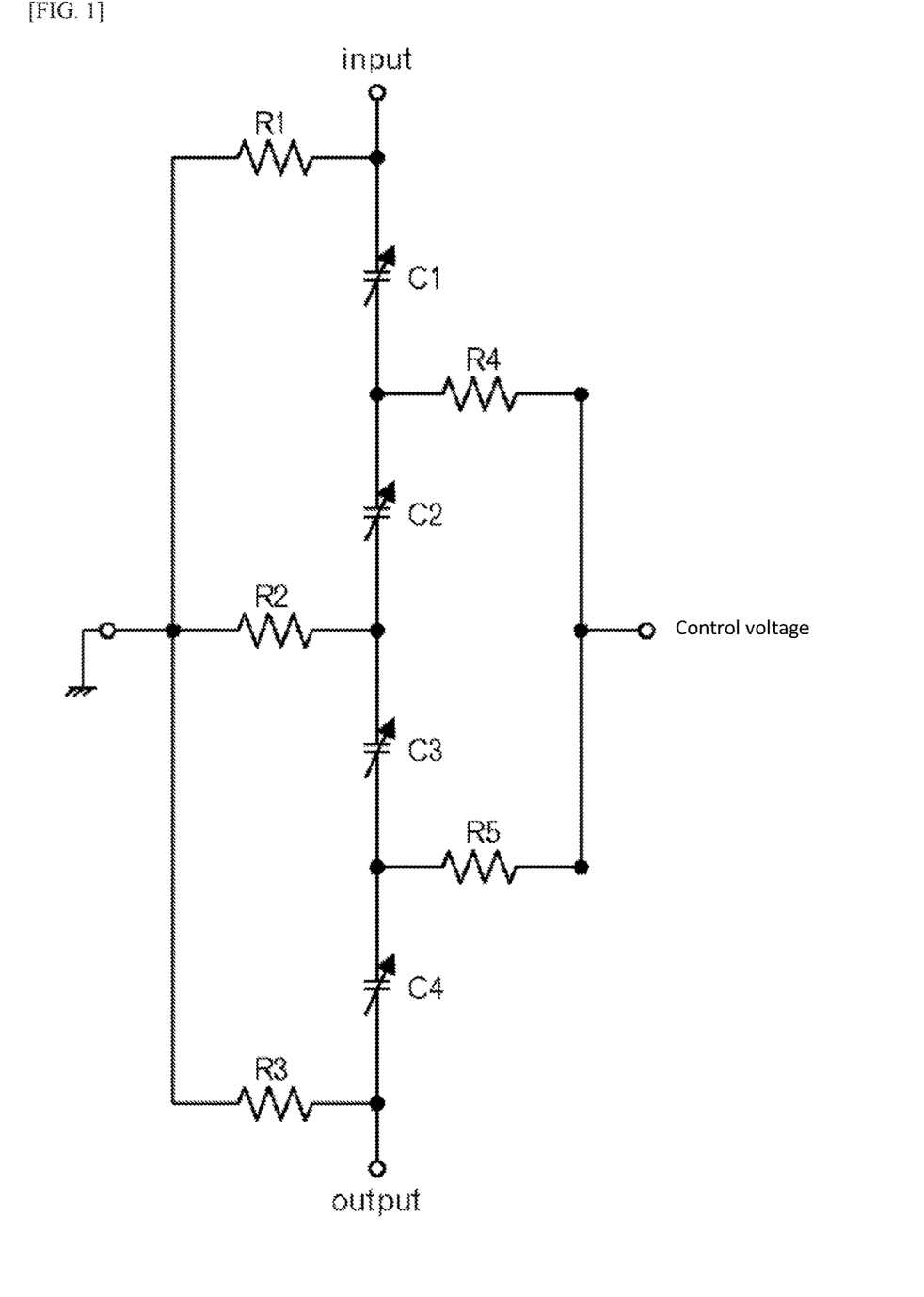
FIG. 1 is a diagram showing a basic equivalent circuit of a circuit contained in a variable capacitance device.

A basic equivalent circuit of the circuit formed inside the variable capacitance device pertaining to this embodiment is shown in FIG. 1.

The circuit for the variable capacitance device pertaining to this embodiment comprises variable capacitance elements C1 to C4 connected in series, and resistors R1 to R5. The variable capacitance elements C1 to C4 are a type of variable capacitance element whose capacitance value decreases as the voltage applied to its both ends increases, and are formed with thin BST ((Ba,Sr)TiO$_3$) film, for example. The resistors R1 to R5 are resistors provided to prevent high-frequency signals from leaking. In this embodiment, signals flow along the variable capacitance elements C1 to C4 connected in series, so the lines connecting the variable capacitance elements C1 to C4 are referred to as the "signal lines."

The resistors R1 to R3 are connected at one end to a terminal for connecting to ground. Also, the other end of the resistor R1 is connected to one end of the variable capacitance element C1, the other end of the resistor R2 is connected to one end of the variable capacitance element C2 and that of the variable capacitance element C3, and the other end of the resistor R3 is connected to one end of the variable capacitance element C4. Furthermore, one end of the resistor R4 and that of the R5 are connected to a terminal for applying control voltage. In addition, the other end of the resistor R4 is connected to the other end of the variable capacitance element C1 and that of the variable capacitance element C2, while the other end of the resistor R5 is connected to the other end of the variable capacitance element C3 and that of the variable capacitance element C4. The foregoing ground-side wiring that contains the resistors R1 to R3, and control voltage application wiring that contains the resistors R4, R5, are referred to as the "bias lines."

In this embodiment, multiple signal lines are provided in parallel in one variable capacitance device to raise the Q value. For example, the capacitance value C of each of the variable capacitance elements C1 to C4 when there is one signal line, is changed to C/2 when two signal lines are provided, or to C/3 when three signal lines are provided.

Figure 2:
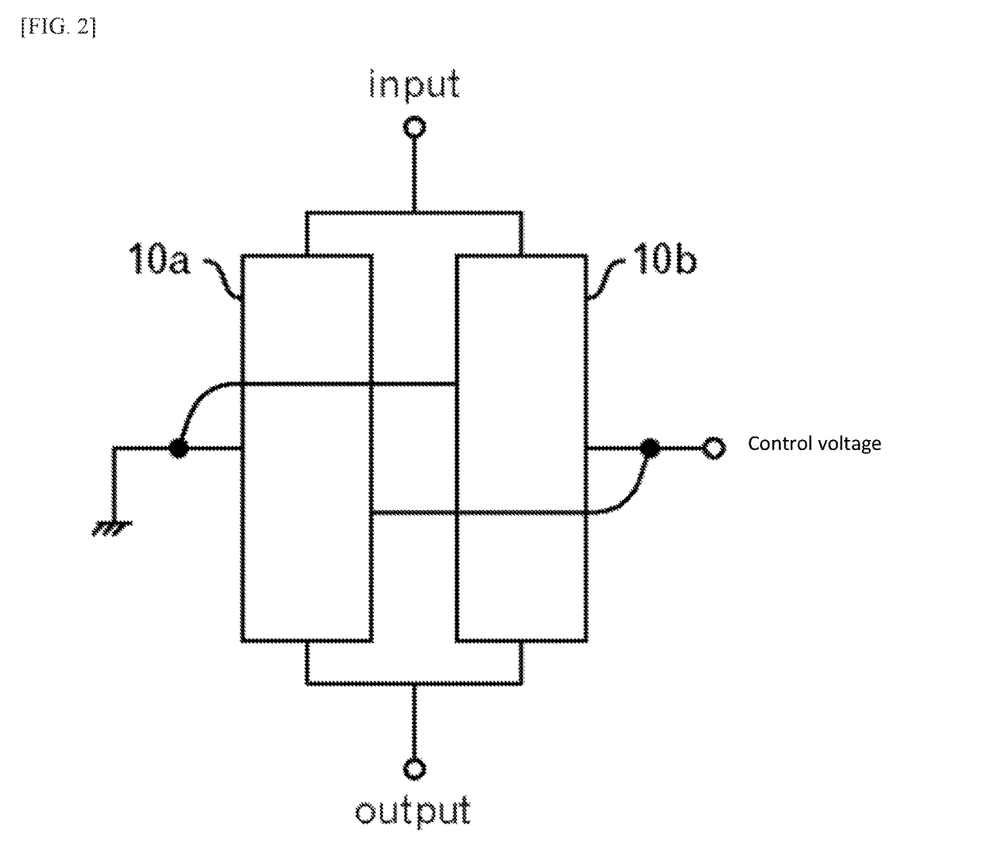
FIG. 2 is a diagram showing a constitutional example of a variable capacitance device.

When two signal lines are provided, for example, the circuit shown in FIG. 1 is expressed by a box per FIG. 2. As shown in FIG. 2, circuits 10a, 10b are provided in parallel. Here, as is evident from FIG. 2, the ground-side terminal and control voltage application terminal are connected by the wirings from the sides of the circuits 10a, 10b, meaning that the wirings cross over the circuits 10a, 10b. When the signal lines are provided in parallel in this way, if the arrangement of the bias lines provided on the sides of the signal lines is not considered, the device may have to be enlarged or wiring layers increased, resulting in higher cost.

Figure 3:
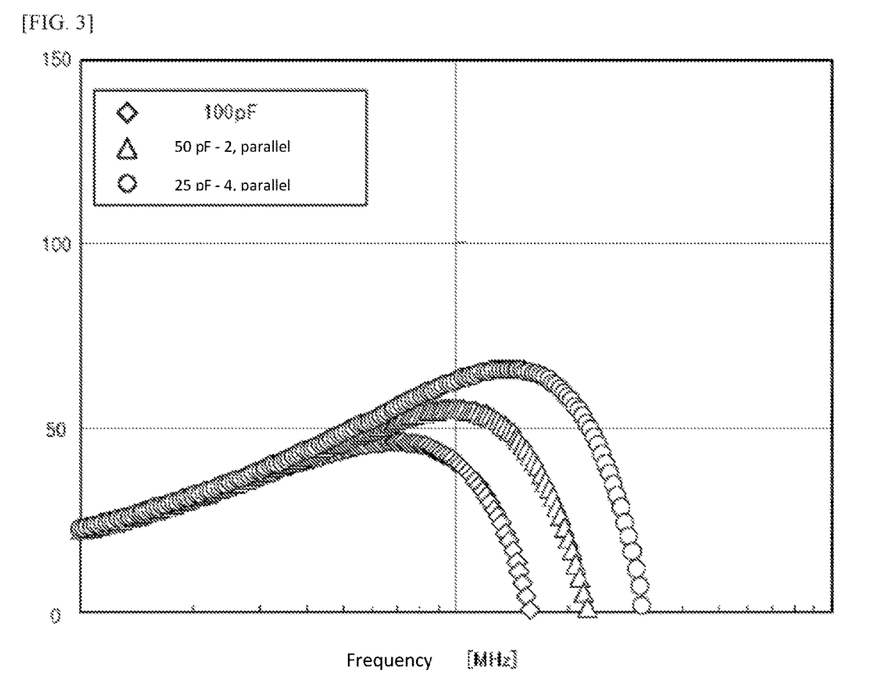
FIG. 3 is a diagram showing an example of the frequency characteristics of the Q value.

Further, the frequency characteristics of the Q value when the composite capacitance of the variable capacitance elements C1 to C4 is 100 pF, when two signal lines are provided and the composite capacitance of the variable capacitance elements C1 to C4 along one signal line is 50 pF, and when four signal lines are provided and the composite capacitance of the variable capacitance elements C1 to C4 along one signal line is 25 pF, are shown in FIG. 3. In FIG. 3, the horizontal axis represents the frequency, while the vertical axis represents the Q value. As shown, the frequency at which the Q value becomes the maximum rises when there are more signal lines. In view of this, providing more signal lines is clearly very effective.

Figure 4:
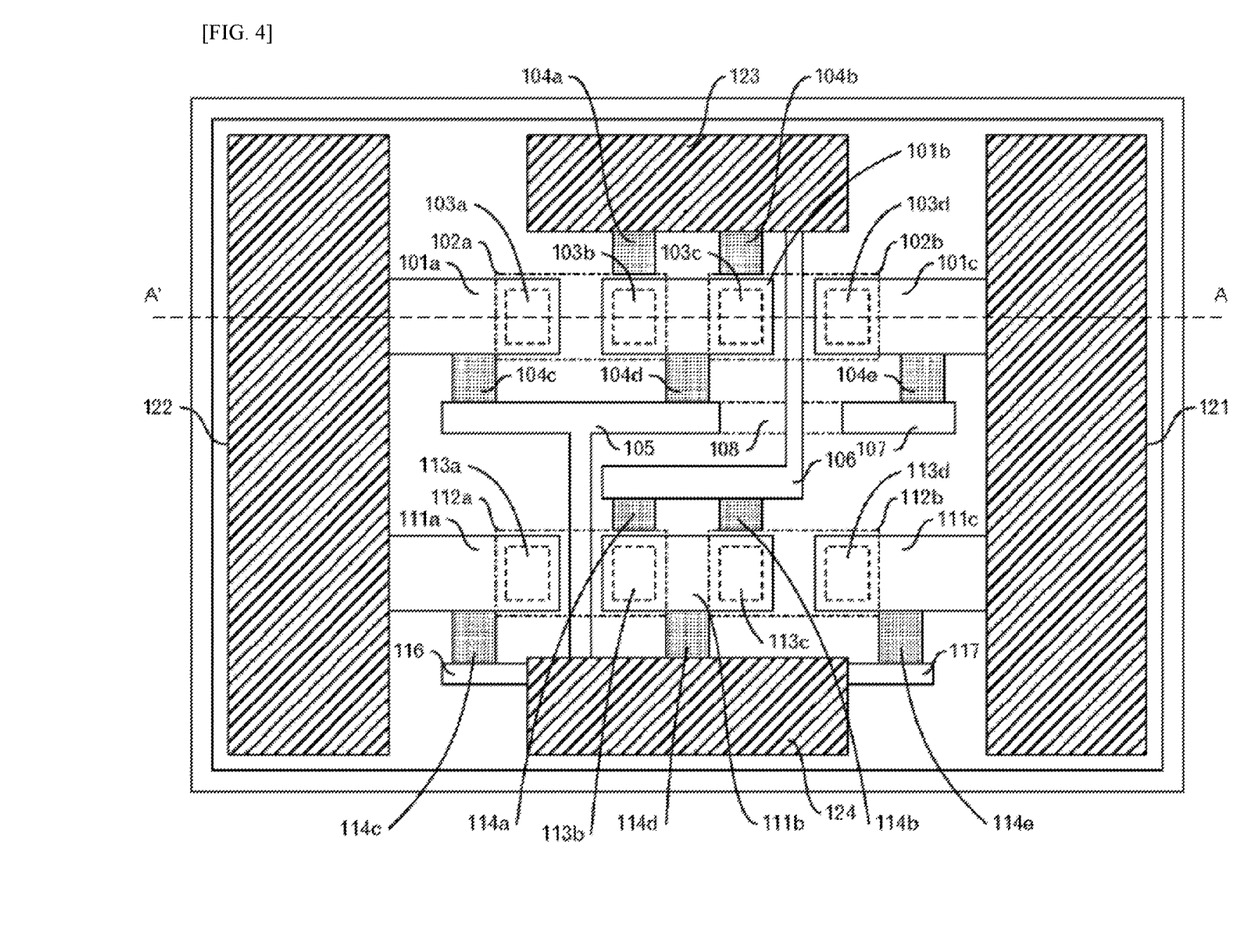
FIG. 4 is a plan view of the variable capacitance device pertaining to the first embodiment.

Accordingly, a plan view of a variable capacitance device having two signal lines is shown in FIG. 4 as an example. It should be noted that FIG. 4 only shows essential parts, and the substrate and other nonessential parts are omitted.

The first signal line has, sequentially from the top layer, wiring layers 101a to 101c, top electrodes 103a to 103d, dielectric layers formed under the top electrodes 103a to 103d, respectively, and bottom electrodes 102a, 102b. The variable capacitance elements are formed in the same quantity as the top electrodes 103a to 103d. The wiring layer 101a is connected to an input terminal 122, while the wiring layer 101c is connected to an output terminal 121.

The bottom electrode 102a is connected via a resistor film 104a, while the bottom electrode 102b is connected via a resistor film 104b, to a control voltage application terminal 123. On the other hand, the wiring layer 101a is connected to a ground terminal 124 via a resistor film 104c and bias line wiring layer 105. Additionally, the wiring layer 101b is connected to a ground terminal 124 via a resistor film 104d and bias line wiring layer 105. Also, the wiring layer 101c is connected to the ground terminal 124 via a resistor film 104e and bias line wiring layers 105, 108 and 107.

Also, the second signal line has, sequentially from the top layer, wiring layers 111a to 111c, top electrodes 113a to 113d, dielectric layers formed under the top electrodes 113a to 113d, respectively, and bottom electrodes 112a, 112b. Here, too, the variable capacitance elements are formed in the same quantity as the top electrodes 113a to 113d. The wiring layer 111a is connected to the input terminal 122, while the wiring layer 111c is connected to the output terminal 121.

The bottom electrode 112a is connected to the control voltage application terminal 123 via a resistor film 114a and bias line wiring layer 106. Also, the bottom electrode 112b is connected to the control voltage application terminal 123 via a resistor film 114b and bias line wiring layer 106.

On the other hand, the wiring layer 111a is connected to the ground terminal 124 via a resistor film 114c and bias line wiring layer 116. Also, the wiring layer 111b is connected to the ground terminal 124 via a resistor film 114d. Also the wiring layer 111c is connected to the ground terminal 124 via a resistor film 114e and bias line wiring layer 117.

In this embodiment, the control voltage application terminal 123 cannot be connected to the second signal line without crossing the first signal line. Similarly, the ground terminal 124 cannot be connected to the first signal line without crossing the second signal line.

In this embodiment, therefore, a part of the signal line wiring layer 106 is arranged so that it passes between the variable capacitance element that includes the top electrode 103c and the variable capacitance element that includes the top electrode 103d. Also, because the wiring layer 106, as well as the wiring layers 101a to 101c, and 111a to 111c, are formed in the same layer, there is no increase in wiring layers and consequently cost increase is suppressed. As described, empty space is effectively utilized.

Additionally, a part of the signal line wiring layer 105 is arranged so that it passes between the variable capacitance element that includes the top electrode 113a and the variable capacitance element that includes the top electrode 113b. Also, because the wiring layer 105, as well as the wiring layers 101a to 101c, and 111a to 111c, are formed in the same layer, there is no increase in wiring layers and consequently cost increase is suppressed. As described, empty space is effectively utilized.

In the example of FIG. 4, four variable capacitance elements are included in one signal line and the wiring layers 101a to 101c are divided into three, and accordingly there are two spaces the wiring layer 106 can pass through. Similarly, the wirings 111a to 111c are divided into three, so there are two spaces the wiring layer 105 can pass through. This means that the two spaces present along the same line can be used, but because doing so increases the area size of the device as a whole, in this embodiment the spaces each having a different distance from the input terminal 122 or output terminal 121 (also referred to as "relative position" from the reference position) are used in the signal lines.

Also, to prevent the wiring layer 105 connected to the ground terminal 124 from crossing the wiring layer 106 connected to the control voltage application terminal 123, a wiring layer 108 is formed in the same layer as the bottom electrodes 102a, 102b, and 112a, 112b, and the wiring layer 105 is connected, via this wiring layer 108, to the wiring layer 107 which is in the same layer as the wiring layer 105.

Figure 5:
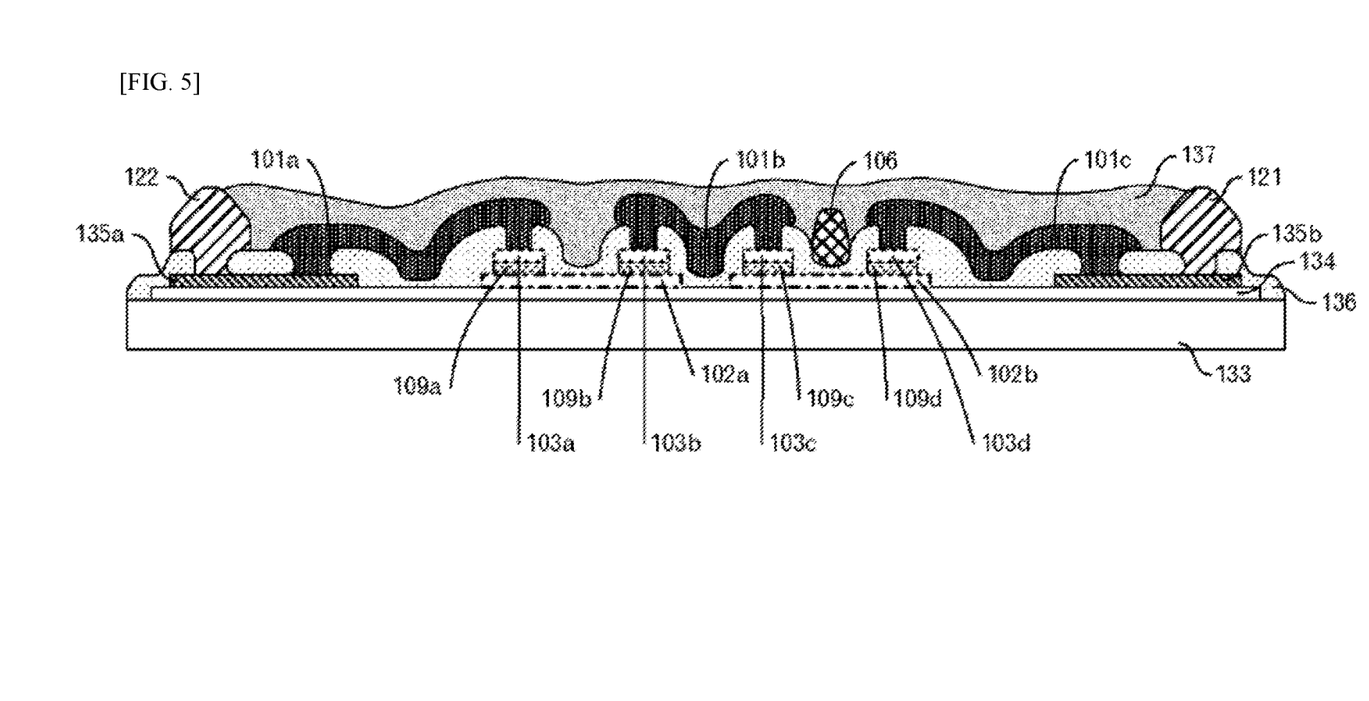
FIG. 5 is a view showing an AA' cross section of the variable capacitance device pertaining to the first embodiment.

Next, FIG. 5 shows a section view cut along line AA' in FIG. 4. An insulation layer 134 is formed on a substrate 133, and the bottom electrodes 102a, 102b, wiring layer 135a to be connected to the terminal 122, and wiring layer 135b to be connected to the terminal 121, are formed on the insulation layer 134. And, on the bottom electrode 102a, a dielectric layer 109a and top electrode 103a, and dielectric layer 109b and top electrode 103b, are formed. Also, on the bottom electrode 102b, a dielectric layer 109c and top electrode 103c, and dielectric layer 109d and top electrode 103d, are formed. Furthermore, on top thereof, the wiring layers 101a to 101c, and wiring layer 106 in the same layer as the wiring layers 101a to 101c, are formed. An interlayer insulation film 136 is formed below the wiring layers 101a to 101c. Also, a protective film 137 is formed above the wiring layers 101a to 101c. This way, the cost of forming the wiring layer 106 is suppressed.

The substrate 133 is a silicone substrate or sapphire or other single-crystal substrate, for example. On this substrate 133, the bottom electrode 102 layer, dielectric layer 109, and top electrode 103 layer are sequentially formed as film in a manner covering almost the entire surface of the substrate 133. When each film layer has been formed, the top electrode 103 layer, dielectric layer 109, and bottom electrode 102 layer are sequentially etched to a specified shape.

Since high-temperature sputtering is performed to form the dielectric layer 109, material of high melting point is used for the bottom electrode 102 layer. To be specific, this layer is made of Pt, Pd or other metal material.

Additionally, the bottom electrode 102 layer is formed by high-temperature sputtering, after which the dielectric layer is formed as film by sputtering.

At this point in time, heat treatment may be applied for 5 to 90 minutes or so at a temperature of 400 to 700° C. in atmosphere or nitrogen or oxygen ambience in order to stabilize or improve the leak current characteristics of the capacitance elements. Preferably the bottom electrode 102 layer is made thicker in consideration of the resistance component of the capacitance.

Preferably the dielectric layer 109 is a dielectric layer of high dielectric constant constituted by perovskite oxide crystal grains containing at least Ba, Sr, and Ti. This dielectric layer 109 is formed on the surface of the bottom electrode 102.

For example, using a dielectric material that gives perovskite oxide crystal grains as the target, film is formed to a desired thickness according to the sputtering method.

Desirably the top electrode 103 uses Pt, etc., in order to improve its heat resistance and adhesion with respect to the dielectric layer 109.

Although the thickness of the top electrode 103 need not be considered much because it has no notable direct impact on the resistance of the element compared to the thickness of the bottom electrode 102, a rough guide is 0.1 to 10 μm or so.

As mentioned above, the bias line connected to the ground terminal 124 contains the wiring layer 105 and the resistor film 104 which is a thin film resistor, and electrically connected to the top electrode 103. On the other hand, in a similar manner the control voltage application terminal 123 is electrically connected to the bottom electrode 102 via the wiring layer 106 and resistor film 104.

Since the loss component of a variable capacitance element is determined by its signal line, use of a bottom electrode of high resistance for the bias line that contains the wiring layer 108 should not present problems.

The wiring layers 101, 106 are formed as new films after the forming of the bottom electrode 102 layer, dielectric layer 109, and top electrode 103 layer, as well as the subsequent forming of the interlayer insulation film 136.

For this, desirably the lift-off method or plating is used in order to protect the bottom electrode 102 layer, dielectric layer 109, and top electrode 103 layer already formed.

For the material of the thin film resistor constituting the resistor film 104, one whose specific resistance is 1 mΩcm or more is desired.

By using such high-resistance material, a thin film resistor having desired resistance can be produced with a shape small in size, which is advantageous to size reduction and high integration. Specific thin film resistor materials that effectively meet such demand include tantalum nitride, TaSiN, and Ta—Si—O.

For example, a thin film resistor having a desired composition ratio and resistivity can be formed according to the reactive sputtering method, by using Ta and SiN as the targets and adding nitrogen to the ambience.

Furthermore, after this resistive thin film has been formed by the sputtering method, resist is applied and patterned to a specified shape, after which the film is masked and put through a reactive ion etching (ME) or other etching process, so that a specified shape can be achieved with ease.

Thereafter, the connection part of the terminals 121, 122 is opened to form the interlayer insulation film 136. For the interlayer insulation film 136, polyimide film which is an organic insulation film, sputtered $SiO_2$—$Al_2O_3$ film or CVD-$SiO_2$ film which is each an inorganic insulation film, or laminate film of the foregoing or the like is used.

After the interlayer insulation film 136 has been patterned, the wiring layers 101a to 101c in the signal line that connects the input terminal 122 and output terminal 121 with the variable capacitance elements in series, and the wiring layer 106 in the bias line that connects the control voltage application terminal 123 and ground terminal 124 via the resistor film 104, are formed. For the material of these wiring layers 101a to 101c and 106, etc., Cu, Al, or the like with low resistance is suitable. The thickness is 0.1 μm to 20 μm or so.

Thereafter, the protective film 137 is formed for the purpose of moisture-proofing, except in areas where the terminals 121 to 124 are formed. The protective film 137 is sputtered $SiO_2$ or CVD-$SiO_2$ film which is each an inorganic insulation film, or polyimide film which is an organic insulation film, or the like. Lastly, the terminals 121 to 124 are plated with Sn, etc., and then the circuit containing a group of variable capacitance elements is mounted on the substrate.

Figure 6:
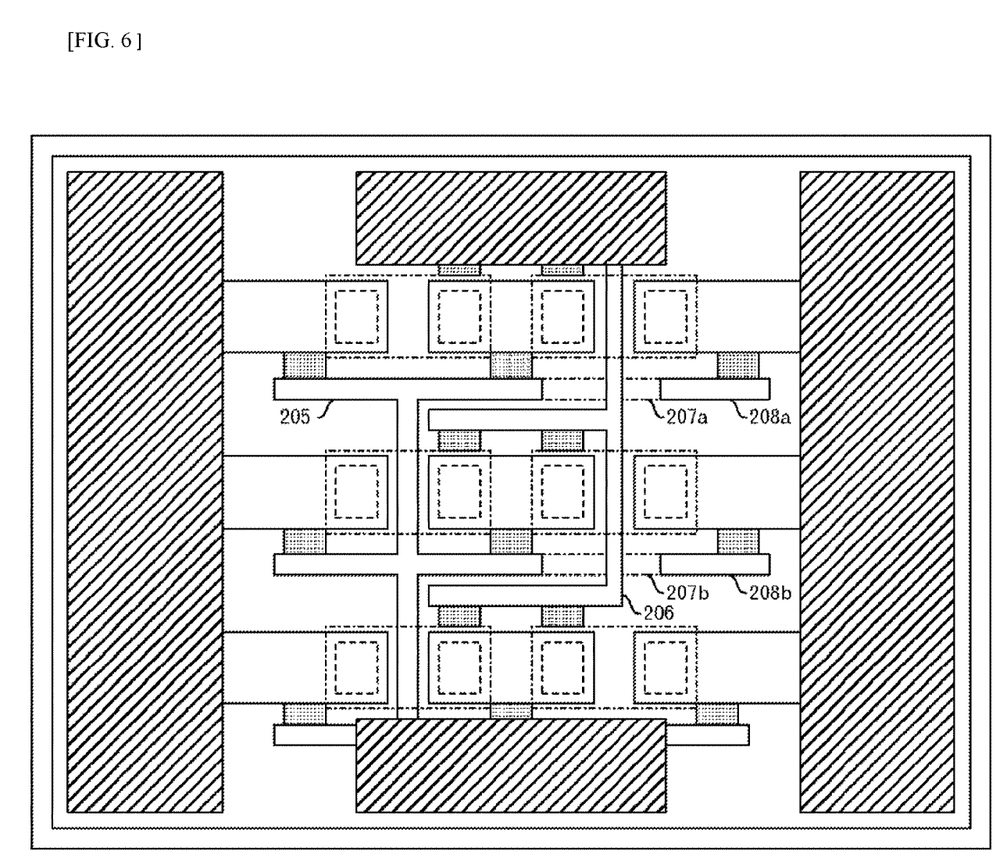
FIG. 6 is a plan view of a variable capacitance device with three signal lines.

The foregoing is an example where there are two signal lines, but if there are three signal lines, for example, then the layout will look like the one shown in FIG. 6, for example. Detailed explanations are not given because the basic layout is the same as the one shown in FIG. 4, except that a wiring layer 206 of the bias line for control voltage application is longer than that in FIG. 4 because of the second and third signal lines from the top. Similarly, a wiring layer 205 of the bias line for ground is longer than that in FIG. 4 because of the second and third signal lines from the bottom. To prevent the wiring layers 205, 206 from crossing each other, partial wiring layers 207a, 207b are formed in the same layer as the bottom electrode and connected to the wiring layer 205 and wiring layers 208a, 208b.

Figure 7:
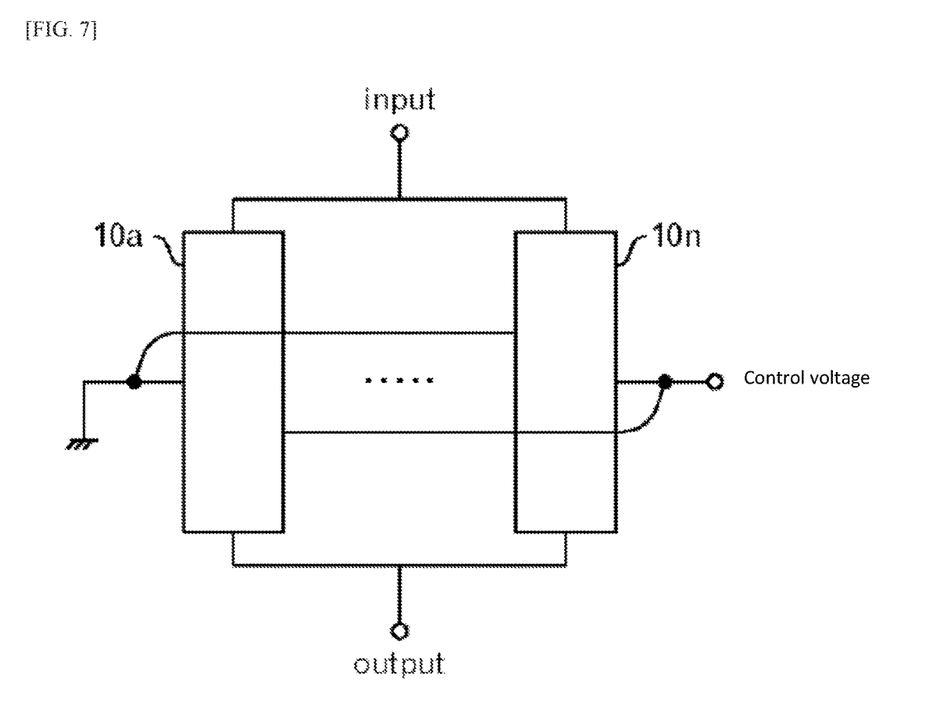
FIG. 7 is a diagram showing a constitutional example of a variable capacitance device with n signal lines.

This way, the bias lines are still properly wired within the variable capacitance device and the variable capacitance element in each signal line functions, as schematically illustrated in FIG. 7, even when the number of signal lines increases.

Since no additional wiring layers are required for the bias lines, as described above, cost increase is suppressed. Also, because low-ε polyimide, etc., is used for the interlayer insulation film, there is hardly any electrical coupling between the signal line and bias line and therefore the impedance frequency characteristics of the element are not affected.

Embodiment 2

Figure 8:
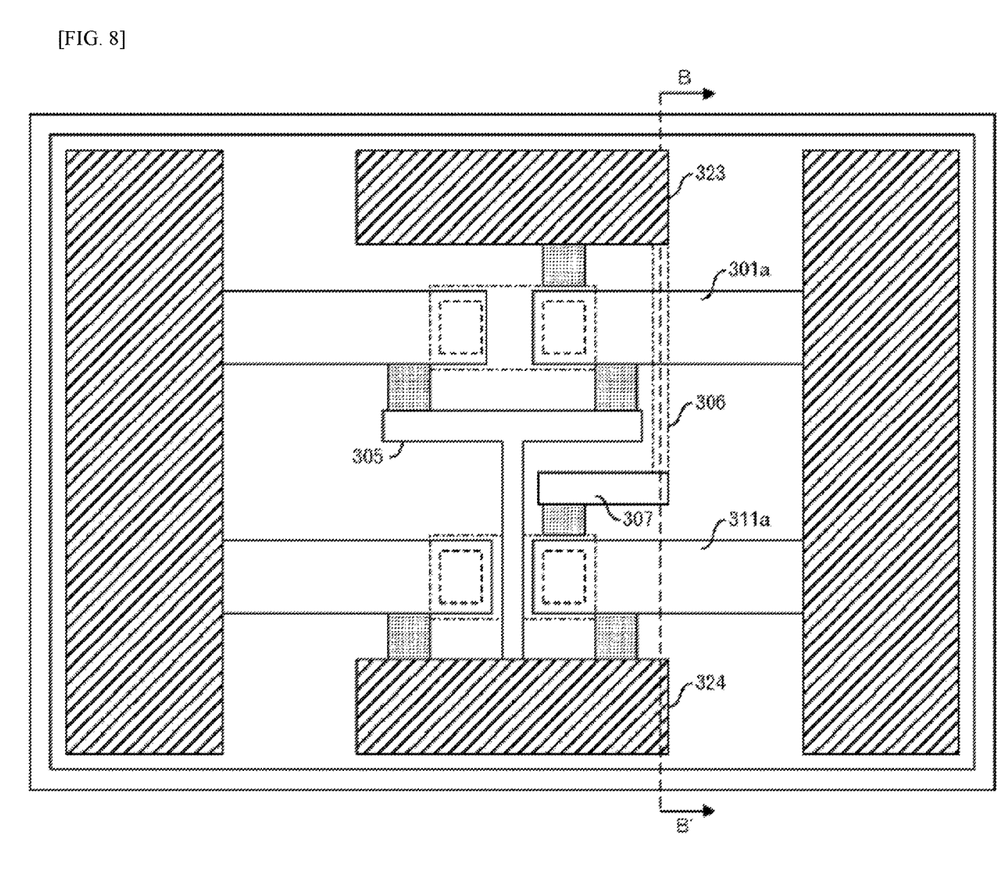
FIG. 8 is a plan view of the variable capacitance device pertaining to the second embodiment.

The first embodiment gave an example of providing four variable capacitance elements in one signal line. There can be any number of variable capacitance elements. In general, however, two or a greater even number of variable capacitance elements are often provided. If there are four or more variable capacitance elements, two or more spaces are provided through which to pass a bias line, as explained in the first embodiment, which allows for passing of two bias lines for control voltage application and ground connection. If there is one signal line containing only two variable capacitance elements, on the other hand, there is only one space through which to pass a bias line, which means that one bias line must be formed in the same layer as the bottom electrode. This case is shown in FIG. 8.

Detailed explanations are not given because the basic structure is the same as the one shown in FIG. 4, except that a bottom wiring layer 306 in the bias line connected to a control voltage application terminal 323 is formed in the same layer as the bottom electrode, and after the first signal line from the top, it is connected to a wiring layer 307 formed in the same layer as top wiring layers 301a, 311a, and furthermore the wiring layer 307 is connected, via the resistor film, to the bottom electrode for the second signal line from the top.

On the other hand, a wiring layer 305 in the bias line connected to a ground terminal 324 extends by passing between the variable capacitance elements in the second signal line from the top and connects, via the resistor film, to the top wiring layer 301a, etc., in the first signal line from the top.

This way, too, there is no need for additional wiring layers and thus cost increase can be suppressed, while the Q value can be raised, as well.

Figure 9:
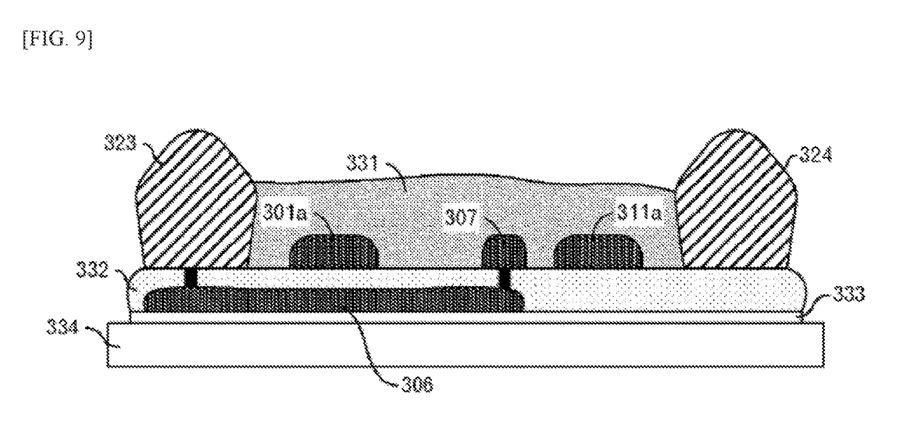
FIG. 9 is a view showing a BB' section of the variable capacitance device pertaining to the second embodiment.

Also, FIG. 9 shows a section view of FIG. 8 cut through line BB'. As shown in FIG. 9, the bottom wiring layer 306 is formed on an insulation layer 333 which in turn is formed on a substrate 334, in such a way that it runs under the wiring layer 301a above it in the first signal line. This bottom wiring layer 306 is connected to the terminal 323 and further connected to the wiring layer 307. An interlayer insulation film 332 is formed between the bottom wiring layer 306 and the wiring layer 301a above it. The interlayer insulation film 332 is sputtered $SiO_2$—$Al_2O_3$ film or CVD-$SiO_2$ film which is each an inorganic insulation film, or laminate film consisting thereof. Also, a protective film 331 is sputtered $SiO_2$ film or CVD-$SiO_2$ film which is each an inorganic insulation film, or polyimide film which is an organic insulation film, or the like.

Such constitution also suppresses cost increase because the number of layers need not be increased for wiring the bias lines when multiple signal lines are introduced.

Embodiment 3

Figure 10:
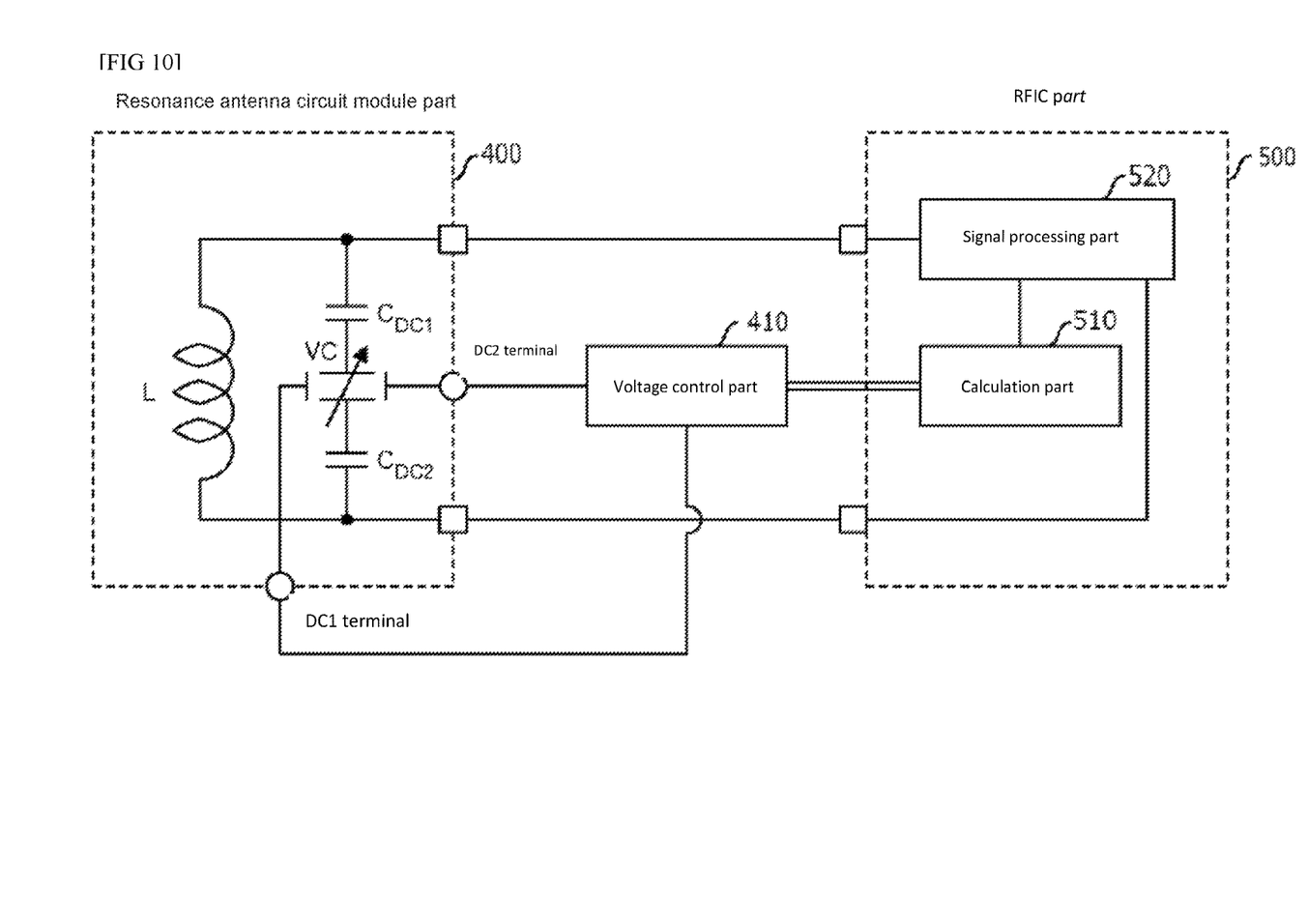
FIG. 10 is a schematic diagram showing the communication apparatus pertaining to the third embodiment.

FIG. 10 shows a constitutional example of the communication apparatus pertaining to this embodiment. This communication apparatus has a RFIC (radio frequency integrated circuit) part 500, voltage control part 410, and resonance antenna circuit module part 400.

The resonance antenna circuit module part 400 has an inductor L, as well as a series connection circuit which is connected to the inductor L in parallel and comprises a DC cut capacitor CDC1, variable capacitance device VC and DC cut capacitor CDC2, in order to form the resonance antenna. The resonance frequency of the resonance antenna circuit module part 400 is determined by the capacitance of the inductor L and that of the series connection circuit.

Also, the RFIC part 500 has a signal processing part 520 and calculation part 510. The signal processing part 520 performs processing for communication, such as demodulating the high-frequency signals RF received by the resonance antenna circuit module part 400. On the other hand, the calculation part 510 controls the operation timings of the signal processing part 520, while also performing processing for instructing the control part 410 at specific timings for the bias voltage to be applied to the DC1 terminal or DC2 terminal. The calculation part 510 also instructs the voltage control part 410 for the bias voltage to be applied to the variable capacitance device VC.

Here, for the variable capacitance device VC of the resonance antenna circuit module part 400, a variable capacitance device having multiple signal lines, like the one shown in FIG. 4 or FIG. 6, for example, is used.

As described above, a variable capacitance device having multiple signal lines is associated with a higher frequency at which the Q value becomes the maximum, compared to a variable capacitance device having the same composite capacitance but one signal line. Accordingly, the communication apparatus pertaining to this embodiment is more efficient than a communication apparatus that uses a variable capacitance device having the same composite capacitance but a single signal line.

The foregoing explained embodiments of the present invention, but the present invention is not in any way limited to these embodiments. For example, the wiring layers 101, 111, and bottom electrodes 102, 112, in FIG. 4, may be swapped vertically. In this case, the bias line layers are also swapped according to the aforementioned purpose.

The positions of the ground terminal and control voltage application terminal may also be swapped. Also, since the variable capacitance element changes its capacitance according to the difference in applied voltage, voltage other than 0 V may be applied to the ground terminal, and other voltage accounting for the difference may be applied to the control voltage application terminal.

DESCRIPTION OF THE SYMBOLS

C1 to C4 Variable capacitance element
R1 to R5 Resistor

What is claimed is:

1. A variable capacitance device comprising:
   a first signal line that contains multiple first variable capacitance elements connected in series;
   a second signal line that contains multiple second variable capacitance elements connected in series, wherein the first signal line and the second signal line are provided side by side in parallel with respect to an input and an output of the variable capacitance device;
   a first bias line used for applying a first direct-current voltage to each of the multiple first variable capacitance elements and multiple second variable capacitance elements; and
   a second bias line used for applying a second direct-current voltage to each of the multiple first variable capacitance elements and multiple second variable capacitance elements;
   wherein a part of at least one of the first bias line and second bias line is arranged so that it passes between two adjacent first variable capacitance elements among the multiple first variable capacitance elements.

2. A communication apparatus having an inductor that forms a resonance antenna, and a variable capacitance device connected in parallel with the inductor, wherein the variable capacitance device is a variable capacitance device according claim 1.

3. A variable capacitance device comprising:
   a first signal line that contains multiple first variable capacitance elements connected in series;
   a second signal line that contains multiple second variable capacitance elements connected in series;
   a first bias line used for applying a first direct-current voltage to each of the multiple first variable capacitance elements and multiple second variable capacitance elements; and
   a second bias line used for applying a second direct-current voltage to each of the multiple first variable capacitance elements and multiple second variable capacitance elements;
   wherein a part of at least one of the first bias line and second bias line is arranged so that it passes between two adjacent first variable capacitance elements among the multiple first variable capacitance elements, and
   wherein the part of at least one of the first bias line and second bias line is formed in a same layer as one of two electrode layers respectively contained in the two adjacent first variable capacitance elements among the multiple first variable capacitance elements.

4. A communication apparatus having an inductor that forms a resonance antenna, and a variable capacitance device connected in parallel with the inductor, wherein the variable capacitance device is a variable capacitance device according to claim 3.

5. A variable capacitance device comprising:
   a first signal line that contains multiple first variable capacitance elements connected in series;
   a second signal line that contains multiple second variable capacitance elements connected in series;
   a first bias line used for applying a first direct-current voltage to each of the multiple first variable capacitance elements and multiple second variable capacitance elements; and
   a second bias line used for applying a second direct-current voltage to each of the multiple first variable capacitance elements and multiple second variable capacitance elements;
   wherein a part of at least one of the first bias line and second bias line is arranged so that it passes between two adjacent first variable capacitance elements among the multiple first variable capacitance elements, and
   wherein: a number of the first variable capacitance elements is 4 or greater; a number of the second variable capacitance elements is 4 or greater; a part of the first bias line is arranged so that it passes between two adjacent first variable capacitance elements among the multiple first variable capacitance elements; a part of the second bias line is arranged so that it passes between two adjacent second variable capacitance elements among the multiple second variable capacitance elements; and relative positions of the two first variable capacitance elements among the multiple first variable capacitance elements are different from relative positions of the two second variable capacitance elements among the multiple second variable capacitance elements.

6. A variable capacitance device according to claim 5, wherein the part of the first bias line and part of the second bias line are formed in a same layer as one of two electrode layers respectively contained in the two adjacent first variable capacitance elements among the multiple first variable capacitance elements.

7. A variable capacitance device according to claim 6, wherein an other part of the first bias line is formed in a same layer as an other of the two electrode layers.

8. A communication apparatus having an inductor that forms a resonance antenna, and a variable capacitance device connected in parallel with the inductor, wherein the variable capacitance device is a variable capacitance device according to claim 7.

9. A communication apparatus having an inductor that forms a resonance antenna, and a variable capacitance device connected in parallel with the inductor, wherein the variable capacitance device is a variable capacitance device according to claim 6.

10. A communication apparatus having an inductor that forms a resonance antenna, and a variable capacitance device connected in parallel with the inductor, wherein the variable capacitance device is a variable capacitance device according to claim 5.

\* \* \* \* \*